US011668371B2

(12) United States Patent
Kunihiro et al.

(10) Patent No.: US 11,668,371 B2
(45) Date of Patent: Jun. 6, 2023

(54) V-RIBBED BELT AND USE THEREOF

(71) Applicant: Mitsuboshi Belting Ltd., Kobe (JP)

(72) Inventors: Yasutsugu Kunihiro, Hyogo (JP);
Hiroki Imai, Hyogo (JP); Yuji Maruyama, Hyogo (JP); Arata Hasegawa, Hyogo (JP); Yorifumi Hineno, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 921 days.

(21) Appl. No.: 16/329,289

(22) PCT Filed: Aug. 25, 2017

(86) PCT No.: PCT/JP2017/030600
§ 371 (c)(1),
(2) Date: Feb. 28, 2019

(87) PCT Pub. No.: WO2018/043355
PCT Pub. Date: Mar. 8, 2018

(65) Prior Publication Data
US 2019/0219134 A1   Jul. 18, 2019

(30) Foreign Application Priority Data

Aug. 29, 2016  (JP) .............................. JP2016-166923
Aug. 23, 2017  (JP) .............................. JP2017-159935

(51) Int. Cl.
*F16G 5/20* (2006.01)
*F16G 5/06* (2006.01)
(Continued)

(52) U.S. Cl.
CPC ................ *F16G 5/20* (2013.01); *B32B 3/30* (2013.01); *B32B 25/04* (2013.01); *C08L 23/08* (2013.01);
(Continued)

(58) Field of Classification Search
CPC ...... F16G 5/20; F16G 5/06; F16G 5/08; B32B 3/30; B32B 3/04
See application file for complete search history.

(56) References Cited

U.S. PATENT DOCUMENTS 4,773,895 A * 9/1988 Takami ................... F16G 5/20
474/238
5,674,143 A * 10/1997 Kumazaki ............... F16G 5/20
474/263

(Continued)

FOREIGN PATENT DOCUMENTS

CN        102297019 A    12/2011
EP         0722053 A2     7/1996
(Continued)

OTHER PUBLICATIONS

Feb. 27, 2020—(CN) Notification of First Office Action—App 201780052510.5.

(Continued)

*Primary Examiner* — Michael R Mansen
*Assistant Examiner* — Mark K Buse
(74) *Attorney, Agent, or Firm* — Banner & Witcoff, Ltd.

(57) ABSTRACT

A V-ribbed belt has a plurality of V-rib portions extending along a longitudinal direction of the belt and in parallel with one another. The V-ribbed belt includes a compression rubber layer including a frictional power transmission face at least a part of which is configured to come in contact with a V-rib groove portion of pulleys. The frictional power transmission face of the compression rubber layer is formed from a vulcanizate of a rubber composition containing a rubber component and a noise suppression improver. A V-rib angle of the V-rib portions is larger than a V-rib groove angle of the pulleys by 5° to 9°.

9 Claims, 6 Drawing Sheets

(51) Int. Cl.
  *F16G 5/08* (2006.01)
  *F16G 5/00* (2006.01)
  *F16H 7/02* (2006.01)
  *C08L 71/02* (2006.01)
  *C08L 23/08* (2006.01)
  *B32B 3/30* (2006.01)
  *B32B 25/04* (2006.01)

(52) U.S. Cl.
  CPC .............. *C08L 71/02* (2013.01); *F16G 5/00* (2013.01); *F16G 5/06* (2013.01); *F16G 5/08* (2013.01); *F16H 7/02* (2013.01); *B32B 2433/04* (2013.01)

(56) References Cited

U.S. PATENT DOCUMENTS

| | | | | |
|---|---|---|---|---|
| 6,358,171 | B1* | 3/2002 | Whitfield | F16G 5/20 474/266 |
| 6,491,598 | B1* | 12/2002 | Rosenboom | B32B 25/14 474/260 |
| 8,235,852 | B2 | 8/2012 | Hineno et al. | |
| 2003/0050143 | A1* | 3/2003 | Gregg | F16G 5/06 474/263 |
| 2003/0087715 | A1* | 5/2003 | Fujimoto | F16G 5/20 474/237 |
| 2004/0115413 | A1* | 6/2004 | Lofgren | F16G 5/20 428/297.4 |
| 2004/0214676 | A1* | 10/2004 | Shiriike | F16G 5/06 474/260 |
| 2007/0060431 | A1* | 3/2007 | Hineno | F16G 5/06 474/263 |
| 2009/0291796 | A1* | 11/2009 | Mitsutomi | F16G 5/166 474/252 |
| 2009/0298633 | A1 | 12/2009 | Hineno et al. | |
| 2011/0124453 | A1* | 5/2011 | Nakashima | F16G 5/20 474/139 |
| 2011/0129647 | A1* | 6/2011 | Duke, Jr. | D06M 15/572 428/156 |
| 2011/0300981 | A1* | 12/2011 | Takahashi | C08L 91/00 474/264 |
| 2014/0378256 | A1 | 12/2014 | Tamura et al. | |
| 2016/0040749 | A1* | 2/2016 | Kageyama | B32B 3/30 474/8 |
| 2016/0273616 | A1* | 9/2016 | Takehara | F16G 1/08 |

FOREIGN PATENT DOCUMENTS

| | | |
|---|---|---|
| JP | S61-140238 U | 8/1986 |
| JP | S63-147951 U | 9/1988 |
| JP | H02-042913 Y2 | 11/1990 |
| JP | H08-184347 A | 7/1996 |
| JP | 2000-074154 A | 3/2000 |
| JP | 2003-172414 A | 6/2003 |
| JP | 2007-070592 A | 3/2007 |
| JP | 2007-232205 A | 9/2007 |
| JP | 2008-185162 A | 8/2008 |
| JP | 2009-168243 A | 7/2009 |
| JP | 2009-250293 A | 10/2009 |
| JP | 2010-242825 A | 10/2010 |
| JP | 2010-276127 A | 12/2010 |
| JP | 2013-177967 A | 9/2013 |
| JP | 2015-194239 A | 11/2015 |

OTHER PUBLICATIONS

Apr. 1, 2020—(EP) Extended Search Report—App 17846360.0.
Mar. 5, 2019—(JP) Notification of Reasons for Refusal—App 2017-159935.
Nov. 21, 2017—International Search Report—Intl App PCT/JP2017/030600.

* cited by examiner

V-RIBBED BELT AND USE THEREOF

CROSS REFERENCE TO RELATED APPLICATIONS

This is a U.S. National Phase Application under 35 U.S.C. § 371 of International Application No. PCT/JP2017/030600, filed Aug. 25, 2017, which claims priority to Japanese Application Nos. 2016-166923, filed Aug. 29, 2016 and 2017-159935, filed Aug. 23, 2017, which was published Under PCT Article 21(2), the entire contents of which are incorporated herein by reference.

TECHNICAL FIELD

The present invention relates to a V-ribbed belt used for driving an automobile engine auxiliary machine or the like, and particularly relates to a V-ribbed belt and an application thereof, capable of improving fuel economy (i.e., reducing torque loss) while stabilizing a friction state of a frictional power transmission face to thereby keep noise suppression (i.e., silence).

BACKGROUND ART

An auxiliary machine such as an alternator, a water pump, a power steering pump, etc. is attached to an internal combustion engine (engine) of an automobile or the like. Typically such an auxiliary machine is mechanically driven by a crank shaft of the engine through a power transmission mechanism in which a transmission belt is wound.

In recent years, a demand for a technique to reconcile fuel economy and noise suppression (i.e., silence) has increased in an automobile engine. As for the fuel economy, it is desired to reduce torque loss in a power transmission mechanism (i.e., a difference between driving torque in a crank shaft and driven torque in a driven shaft (belonging to auxiliary machine)) from the viewpoints of reduction in friction loss of the engine, improvement of fuel consumption, etc.

Specifically, a V-ribbed belt is used as a transmission belt for use in an auxiliary machine driving system of an engine. As for the V-ribbed belt, techniques for reducing torque loss have been proposed.

JP-A-2010-276127 (Patent Literature 1) proposes a V-ribbed belt in which internal loss (i.e., self-heating) is reduced by use of a rubber composition having a small loss tangent tan δ to thereby reduce torque loss. JP-A-2013-177967 (Patent Literature 2) proposes a V-ribbed belt in which the position of a cord is set on the inner circumferential side to reduce bending stress of the cord (i.e., bending loss of the belt) to thereby reduce torque loss.

According to each of those V-ribbed belts, torque loss can be reduced to some extent. However, the bending amount of the belt wound on pulleys is large in a portion having a small pulley diameter, such as an alternator serving as a power generator. Thus, the reduction of the torque loss is insufficient. Such a portion where large torque loss occurs has great influence on friction loss of an engine. Accordingly, it is a major problem to further reduce the torque loss.

On the other hand, as for the noise suppression in an auxiliary machine driving system of an automobile engine or the like, it is a problem to reduce the friction coefficient of a belt surface (i.e., pulley engagement surface) touching a pulley to thereby improve noise easily generated when misalignment (imperfect alignment) occurs in the pulley or noise caused by a stick-slip phenomenon.

The stick-slip phenomenon means self-excited vibration generated between frictional surfaces due to microscopic adhesion or repeated slippage of the frictional surfaces to each other. The stick-slip phenomenon is a phenomenon which occurs in such a case that the friction coefficient decreases with increase of the slip velocity or intermittent reduction of friction occurs when the friction changes from static friction to dynamic friction. Also in a V-ribbed belt, when the friction coefficient between a pulley and a transmission face rubbing thereon is high (particularly adhesiveness is high), a stick-slip phenomenon (i.e., vibration) in which sticking and slipping are repeated occurs between the frictional surfaces of the belt and the pulley. As a result, abnormal noise (i.e., squeal noise) occurs in a stage changing from the sticking to the slipping. Therefore, there has been proposed a technique in which an additive for improving the noise suppression (i.e., noise suppression improver) is blended to reduce the friction coefficient of the frictional power transmission face to thereby suppress the occurrence of the abnormal noise.

For example, JP-A-2007-70592 (Patent Literature 3) proposes a method in which ultrahigh molecular weight polyethylene powder is blended in a compression rubber layer forming a frictional power transmission face to thereby reduce the friction coefficient thereof, and JP-A-2009-168243 (Patent Literature 4) proposes a method in which flat inorganic powder is blended likewise.

However, although the frictional coefficient can be reduced in those methods, the ultrahigh molecular weight polyethylene powder or the inorganic powder is a compound agent which increases internal loss (i.e., tan δ). Therefore, the methods have a defect of increasing torque loss.

Further, stick-slip noise generated during running when submerged is also a problem. In detail, when wettability of a frictional power transmission face is so low that the (belt-to-pulley) condition of water entering between a belt and a pulley is not uniform, the friction coefficient is high in a place the water has not entered (i.e., dry condition) while the friction coefficient extremely decreases locally in a place the water has entered (i.e., wet condition). As a result, the frictional condition becomes unstable to generate stick-slip noise. Here again, there has been proposed a technique in which a noise suppression improver is blended to improve the affinity of the frictional power transmission face to water to thereby suppress occurrence of abnormal noise.

JP-A-2008-185162 (Patent Literature 5) discloses a frictional power transmission belt having a frictional power transmission face formed from a rubber composition in which 1 to 25 parts by mass of a surfactant is blended relative to 100 parts by mass of an ethylene-α-olefin elastomer. Further, JP-A-2007-232205 (Patent Literature 6) discloses a frictional power transmission belt having a frictional power transmission face formed from a rubber composition in which 10 to 25 parts by weight of a plasticizer having a solubility parameter of 8.3 to 10.7 $(cal/cm^3)^{1/2}$ is blended relative to 100 parts by weight of an ethylene-α-olefin elastomer. In these frictional power transmission belts, the affinity to water of the rubber forming the frictional power transmission face (i.e., ethylene-α-olefin elastomer) is enhanced due to the arrangement of the surfactant or the plasticizer. Thus, abnormal noise caused by stick-slip can be reduced to improve the noise suppression when submerged.

Although the surfactant or the plasticizer oozing to the frictional power transmission face stabilizes the belt-to-pulley frictional condition, the behavior of the surfactant or the plasticizer in the rubber may be unstable. As a result, the internal loss (i.e., tan δ) increases to increase the torque loss.

That is, in the blending design of the rubber composition forming the V-ribbed belt, the noise suppression (i.e., silence) and the fuel economy (i.e., torque loss reduction) are conflicting characteristics, and it is difficult to make the both compatible only by the blending design.

On the other hand, JP-UM-A-63-147951 (Patent Literature 7) discloses a power transmission V-belt device capable of preventing jerky vibration and noise at start. In a transmission apparatus in which a V-belt is hung on a driving V-pulley and a driven V-pulley, an angle $\theta_1$ of the V-belt is made larger than a groove angle $\theta_2$ of each V-pulley by 5° to 15°. A wrapped belt, a low edge belt, a low edge cogged belt and a rib star belt are listed as examples of such V-belts.

JP-A-8-184347 (Patent Literature 8) discloses a V-ribbed belt capable of suppressing sounding or abnormal noise during running of the belt. In the V-ribbed belt, para-aramid fiber is fibrillated to protrude in a surface of a rib portion, and a rib angle which is an angle of a V-shape in the rib portion is 42° to 50°. This literature suggests that the rib angle is made larger than an angle of a V-shaped groove portion of each pulley by 2° to 10°, and by 2.5° or 4.5° in examples. In the literature, examples of rubbers as the material of the belt include chloroprene rubber, hydrogenated nitrile rubber, natural rubber, CSM, and SBR, and the chloroprene rubber is used in an example.

JP-A-2000-74154 (Patent Literature 9) discloses a V-ribbed belt capable of improving the heat life of the belt substantially without lowering the transmission performance of the belt, and further capable of preventing cords exposed in opposite end face portions of the belt from coming off in a short time during operation. In the V-ribbed belt, a rib angle of the belt is set to be 10±2.5° higher than a groove angle of each V-ribbed pulley which is 36° to 50°, or the rib angle is set to be 15±2.5° or 5±2.5° higher than a groove angle of each V-ribbed pulley which is 36° to 45°. In the V-ribbed belt configured thus, the opposite end face portions of the belt are eliminated, or the cords exposed in the opposite end face portions are removed.

Although Patent Literatures 7 to 9 describe that the belt angle and the rib angle are made larger than the groove angle of each pulley, there is no suggestion about a small-diameter pulley and torque loss (i.e., fuel economy), and no noise suppression improver is blended. Patent Literature 7 has no suggestion about the material of the belt, and Patent Literature 9 has no suggestion about the details of rib rubber.

CITATION LIST

Patent Literature

Patent Literature 1: JP-A-2010-276127 (claim 1, paragraph [0008])

Patent Literature 2: JP-A-2013-177967 (claim 1, paragraphs [0001] and [0012])

Patent Literature 3: JP-A-2007-70592 (claim 1, paragraph [0010])

Patent Literature 4: JP-A-2009-168243 (claim 1, paragraph [0015])

Patent Literature 5: JP-A-2008-185162 (claim 1)

Patent Literature 6: JP-A-2007-232205 (claim 1)

Patent Literature 7: JP-UM-A-63-147951 (claims, lines 2-3 in page 4, and lines 2-7 in page 5)

Patent Literature 8: JP-A-8-18347 (claims 1 and 8, paragraphs [0001] and [0014], examples)

Patent Literature 9: JP-A-2000-74154 (claims, paragraph [0020])

SUMMARY OF THE INVENTION

Problem that the Invention is to Solve

An object of the present invention is to provide a V-ribbed belt capable of making noise suppression and fuel economy compatible, a belt transmission apparatus provided with the V-ribbed belt, and a method for reducing torque loss of a belt transmission apparatus using the V-ribbed belt.

Another object of the present invention is to provide a V-ribbed belt capable of reducing torque loss while keeping noise suppression against stick-slip noise, sticking wear noise, etc. even when a noise suppression improver is blended in rubber forming a frictional power transmission face, a belt transmission apparatus provided with the V-ribbed belt, and a method for reducing torque loss of a belt transmission apparatus using the V-ribbed belt.

Further another object of the present invention is to provide a V-ribbed belt capable of reducing torque loss even in a small-diameter pulley such as an alternator serving as a power generator, a belt transmission apparatus provided with the V-ribbed belt, and a method for reducing torque loss of a belt transmission apparatus using the V-ribbed belt.

Means for Solving the Problem

The present inventor et al. made earnest investigation in order to attain the foregoing objects. As a result, the present inventor et al. found that noise suppression and fuel economy can be made compatible when a V-rib angle of V-rib portions in a V-ribbed belt provided with a compression rubber layer containing a noise suppression improver was made lager than a V-rib groove angle of each pulley by 5° to 9°. Thus, the present invention was completed.

That is, a V-ribbed belt according to the present invention has a plurality of V-rib portions extending along a longitudinal direction of the belt and in parallel with one another, and includes a compression rubber layer including a frictional power transmission face at least a part of which is configured to come in contact with a V-rib groove portion of pulleys, wherein the frictional power transmission face of the compression rubber layer is formed from a vulcanizate of a rubber composition containing a rubber component and a noise suppression improver, and a V-rib angle of the V-rib portions is larger than a V-rib groove angle of the pulleys by 5° to 9°. The V-rib angle of the V-rib portions is about 41° to 45°. The pulleys may include a pulley having an outer diameter of 65 mm or less. The noise suppression improver may include at least one kind selected from a group consisting of a surfactant, a plasticizer having a larger solubility parameter than the rubber component, inorganic particles, and polyethylene resin particles (particularly a polyethylene glycol nonionic surfactant and/or an ether ester plasticizer). The ratio of the polyethylene glycol nonionic surfactant is about 2 to 20 parts by mass relative to 100 parts by mass of the rubber component. The ratio of the ether ester plasticizer is about 5 to 15 parts by mass relative to 100 parts by mass of the rubber component. The rubber component may contain an ethylene-α-olefin elastomer.

The present invention also includes a belt transmission apparatus including the V-ribbed belt, and pulleys including a V-rib groove portion that can be fitted to the V-rib portions of the V-ribbed belt, wherein a V-rib angle of the V-rib portions is larger than a V-rib groove angle of the pulleys by 5° to 9°. The pulleys may include a pulley having an outer diameter of 65 mm or less.

The present invention also includes a method for reducing torque loss of a belt transmission apparatus, the method including winding the V-ribbed belt on pulleys including a pulley having an outer diameter of 65 mm or less.

Advantage of the Invention

According to the present invention, a V-rib angle of each V-rib portion in a V-ribbed belt provided with a compression rubber layer containing a noise suppression improver is larger than a V-rib groove angle of pulleys by 5° to 9°, so that noise suppression and fuel economy can be made compatible. In detail, even when the noise suppression improver which is a foreign substance is blended into rubber forming a frictional power transmission face, it is possible to reduce torque loss while keeping the noise suppression against stick-slip noise, sticking wear noise, etc. Particularly, the torque loss can be reduced also in a small-diameter pulley such as an alternator serving as a power generator.

MODE FOR CARRYING OUT THE INVENTION

Figure 1:
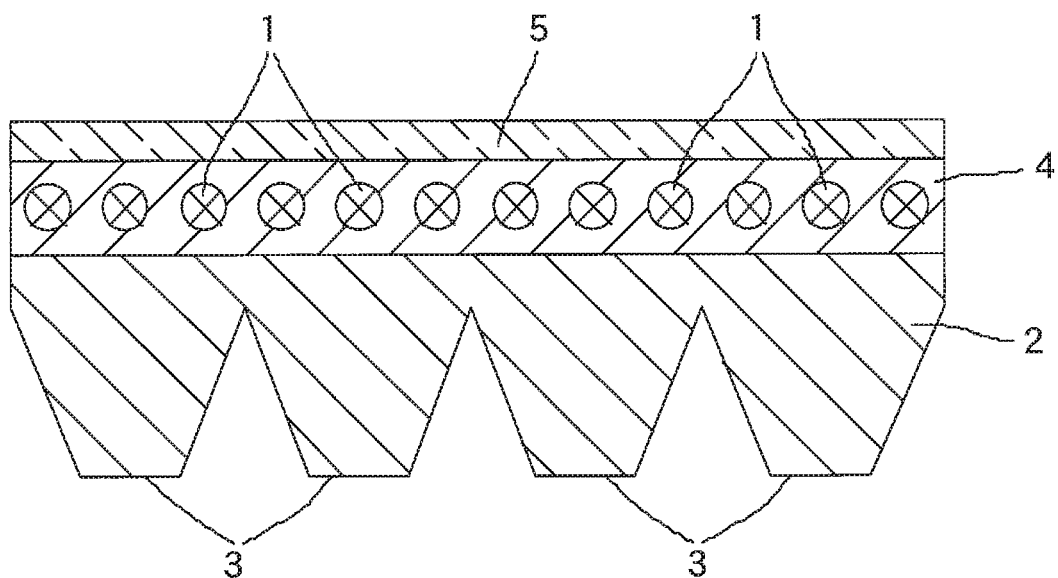
FIG. 1 is a schematic sectional view illustrating an example of a V-ribbed belt according to the present invention.

[Structure of V-Ribbed Belt]
A configuration of a V-ribbed belt according to the present invention is not limited particularly, as long as the V-ribbed belt includes a plurality of V-rib portions extending along a longitudinal direction of the belt and in parallel with one another, and the V-rib portions has a V-rib angle larger than a V-rib groove angle of pulleys. An example of the configuration is illustrated in FIG. 1. FIG. 1 is a schematic sectional view illustrating an example of the V-ribbed belt according to the present invention. The V-ribbed belt illustrated in FIG. 1 has a configuration in which a compression rubber layer 2, an adhesive layer 4 including a tension member 1 embedded therein in the longitudinal direction of the belt, and an extension layer 5 composed of a cover canvas (e.g., woven fabric, knit, non-woven fabric, etc.) are stacked in this order from a belt lower surface (i.e., inner circumferential surface) toward a belt upper surface (i.e., back face). A plurality of sectionally V-shaped grooves extending in the longitudinal direction of the belt are formed in the compression rubber layer 2. A plurality (four in the example illustrated in FIG. 1) of V-rib portions 3 each having a V-shape in section (i.e., inverted trapezoid shape) are formed between the grooves. Two slopes (i.e., surfaces) of each V-rib portion 3 form a frictional power transmission face, which comes in contact with a pulley to transmit power (i.e., frictional power transmission).

The V-ribbed belt according to the present invention is not limited to the aforementioned configuration. The V-ribbed belt includes a compression rubber layer having a transmission face at least a part of which can come in contact with a V-rib groove portion (V-groove portion) of pulleys. Typically the V-ribbed belt may include an extension layer, a compression rubber layer, and a tension member embedded therebetween along the longitudinal direction of the belt. In the V-ribbed belt according to the present invention, the extension layer 5 may be, for example, formed from a rubber composition, and the tension member 1 may be embedded between the extension layer 5 and the compression rubber layer 2 without providing the adhesive layer 4. Further, the V-ribbed belt according to the present invention may have a configuration in which the adhesive layer 4 is provided in either the compression rubber layer 2 or the extension layer 5, and the tension member 1 is embedded between the adhesive layer 4 (provided on compression rubber layer 2 side) and the extension layer 5 or between the adhesive layer 4 (provided on extension layer 5 side) and the compression rubber layer 2.

The compression rubber layer is formed from the aforementioned rubber composition, which will be described in detail below. The extension layer and the adhesive layer do not have to be formed from the same rubber composition as the compression rubber layer, but may be formed from conventional rubber compositions used as an extension layer and an adhesive layer. The rubber compositions forming the extension layer and the adhesive layer do not have to contain any noise suppression improver.

Figure 2:
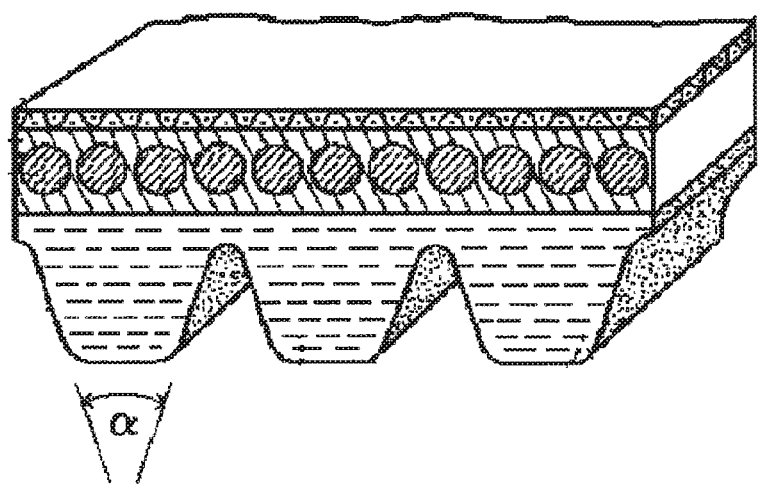
FIG. 2 is a schematic perspective view for illustrating a V-rib angle α of a V-rib portion in the V-ribbed belt according to the present invention.
Figure 3:
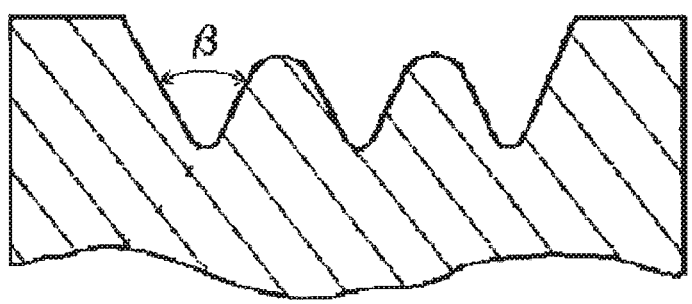
FIG. 3 is a schematic sectional view for illustrating a V-rib groove angle β in a pulley.
Figure 4:
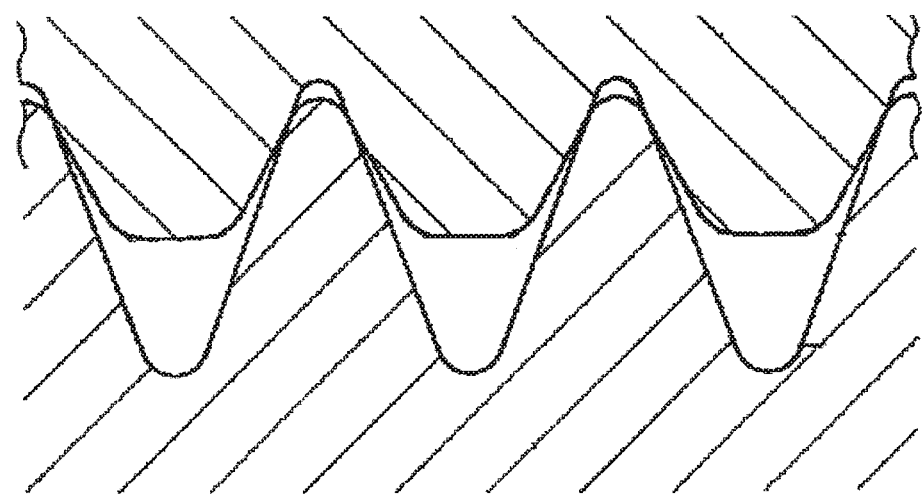
FIG. 4 is a schematic sectional view for illustrating a state in which V-rib portions in the V-ribbed belt according to the present invention are fitted to V-rib groove portions in a pulley.

In the V-ribbed belt according to the present invention, a V-rib angle α in the V-ribbed belt illustrated in FIG. 2 is larger (i.e., a wider angle) than a V-rib groove angle β in a pulley illustrated in FIG. 3, and a difference (α-β) in angle between them is 5° to 9°. According to the present invention, since the V-rib angle α is larger than the V-rib groove angle β by 5° to 9°, it is possible to reduce friction loss (i.e., torque loss in a belt transmission apparatus) without lowering the other characteristics such as the noise suppression (i.e., silence). The reason can be estimated as follows. That is, a portion where energy loss increases due to large heat generated with compressive strain received from the pulley is located near an end portion of each rib portion. Therefore, when the relation of α>β is established, a slight gap can be secured between the end portion of each V-rib portion of the V-ribbed belt and each V-rib groove portion of the pulley as shown in FIG. 4 even when the V-rib portion and the V-rib groove portion is fitted to each other. Thus, heating (i.e., energy loss) near the end portion of the V-rib portion can be reduced.

Although the difference in angle between the V-rib angle α and the V-rib groove angle β may be set at 5° to 9°, the difference in angle is preferably 5.5° to 8.5°, and more preferably 6° to 8° (particularly from 6.5° to 7.5°) or so. When the difference in angle is too small, the torque loss cannot be reduced. When the difference in angle is too large, sticking wear (and abnormal noise due to the sticking wear) of the V-rib portion to a bottom portion of the V-rib groove may occur to lower the noise suppression. Specifically, the V-rib angle α of the V-rib portion is, for example, 35° to 50°, preferably 40° to 47°, and more preferably 41° to 45° or so.

The V-ribbed belt having such a V-rib angle according to the present invention is effective particularly to a small-diameter pulley whose diameter is so small that the bending amount of the belt wound thereon increases. The torque loss is the largest in the small-diameter pulley where the surface pressure against the pulley is the highest. Accordingly, the torque loss in the small-diameter pulley has great influence on the friction loss of the engine. Therefore, the V-ribbed belt according to the present invention is preferably wound on pulleys including a small-diameter pulley. Such a small-diameter pulley may have an outer diameter of 65 mm or less. The outer diameter may be, for example, 10 to 65 mm, preferably 30 to 60 mm, and more preferably 40 to 55 mm or so.

The tension member is not limited particularly. Typically a cord (i.e., twisted cord) which is arrayed at predetermined intervals in a width direction of the belt can be used. High-modulus fiber, for example, synthetic resin such as polyester fiber (e.g., polyalkylene arylate fiber) or aramid fiber, inorganic fiber such as carbon fiber, etc. is generally used as the cord. Polyester fiber (e.g., polyethylene terephthalate fiber or polyethylene naphthalate fiber) or aramid fiber is preferred. The fiber may include multifilament yarns, for example, multifilament yarns having fineness of about 2,000 to 10,000 denier (particularly 4,000 to 8,000 denier).

A twisted cord such as a plied yarn (organzine), a single-twisted yarn, a Lang's lay yarn, etc. using multifilament yarns may be typically used as the cord. The average wire diameter of the cord (i.e., the fiber diameter of the twisted cord) may be, for example, 0.5 to 3 mm, preferably 0.6 to 2 mm, and more preferably 0.7 to 1.5 mm or so. The cord is embedded in the longitudinal direction of the belt. A single cord or a plurality of cords may be embedded at predetermined pitches in parallel with the longitudinal direction of the belt.

In order to improve adhesion to the rubber component, the cord may be embedded between the extension layer and the compression rubber layer (particularly in the adhesive layer) after various bonding treatments using a resorcin-formalin-latex (RFL) solution, an epoxy compound, an isocyanate compound, etc. may be performed on the cord.

Further, the extension layer may include a reinforcing cloth, for example, a cloth material such as woven fabric, wide angle canvas, knit, non-woven fabric, etc. (preferably woven fabric). The aforementioned bonding treatments may be performed on the reinforcing cloth if necessary, so that the reinforcing cloth can be disposed on a surface of the extension layer.

[Compression Rubber Layer]

The V-ribbed belt according to the present invention is provided with a compression rubber layer including a transmission face at least a part of which can come in contact with a V-rib groove portion of pulleys. In the compression rubber layer, the frictional power transmission face is formed from a rubber composition containing a rubber component and a noise suppression improver. For example, the compression rubber layer may be one in which a surface layer portion formed from the aforementioned rubber composition is formed in the frictional power transmission face while the other part (i.e., inner layer portion) does not contain the noise suppression improver. However, from the viewpoint of noise suppression (particularly long-term noise suppression), productivity, etc., it is preferable that the whole of the compression rubber layer is formed from the rubber composition containing the noise suppression improver.

(Rubber Component)

Examples of the rubber component may include well-known rubber components and/or elastomers such as diene rubber [natural rubber, isoprene rubber, butadiene rubber, chloroprene rubber, styrene-butadiene rubber (SBR), acrylonitrile-butadiene rubber (nitrile rubber), hydrogenated nitrile rubber (including a polymer blend of hydrogenated nitrile rubber and unsaturated metal carboxylate), etc.], ethylene-α-olefin elastomer, chlorosulfonated polyethylene rubber, alkylated chlorosulfonated polyethylene rubber, epichlorohydrin rubber, acrylic rubber, silicone rubber, urethane rubber, fluororubber, etc. Each of those rubber components may be used alone, or two or more kinds of the rubber components may be used in combination. Of the rubber components, ethylene-α-olefin elastomer (ethylene-α-olefin rubber such as ethylene-propylene rubber (EPR), ethylene-propylene-diene copolymer (such as EPDM), etc.) is preferred since it does not contain harmful halogens but has ozone resistance, heat resistance and cold resistance and is also excellent in economy.

(Noise Suppression Improver)

According to the present invention, the frictional power transmission face of the compression rubber layer contains the noise suppression improver so that the belt-to-pulley frictional condition can be stabilized to improve the noise suppression. In addition, in spite of the noise suppression improver contained in the compression rubber layer, the torque loss can be also reduced due to each V-rib portion formed with a predetermined angle.

The ratio of the noise suppression improver can be selected within a range of about 1 to 100 parts by mass relative to 100 parts by mass of the rubber component. The ratio of the noise suppression improver is, for example, about 1 to 40 parts by mass (particularly 2 to 35 parts by mass). When the ratio of the noise suppression improver is too low, the noise suppression may be lowered. On the contrary, when the ratio is too high, the torque loss may increase.

A conventional noise suppression improver for stabilizing the belt-to-pulley frictional condition may be used as the noise suppression improver. From the viewpoint of an excellent effect of improving the noise suppression, a surfactant, a plasticizer, inorganic particles, polyethylene resin particles are preferred. Each of those noise suppression improvers may be used alone, or two or more kinds of the noise suppression improvers may be used in combination.

(A) Surfactant

The surfactant may be either an ionic surfactant or a nonionic surfactant, and the surfactant may be selected in accordance with the kind of the rubber component. When the rubber component is an ethylene-α-olefin elastomer, the nonionic surfactant is preferred because it can improve the noise suppression. Particularly a polyethylene glycol nonionic surfactant or a polyhydric alcohol nonionic surfactant is preferred.

The polyethylene glycol nonionic surfactant is a nonionic surfactant in which ethylene oxide is added to a hydrophobic base component having a hydrophobic group, such as higher alcohol, alkyl phenol, higher fatty acid, polyhydric alcohol higher fatty acid ester, higher fatty acid amide, or polypropylene glycol, to impart a hydrophilic group thereto.

Examples of higher alcohols as the hydrophobic base component may include $C_{10\text{-}30}$ saturated alcohols such as lauryl alcohol, tetradecyl alcohol, cetyl alcohol, octadecyl alcohol and aralkyl alcohol, $C_{10\text{-}26}$ unsaturated alcohols such as oleyl alcohol, etc. Examples of alkyl phenols may include $C_{4\text{-}16}$ alkyl phenols such as octyl phenol and nonyl phenol, etc. Each of those higher alcohols may be used alone, or two or more kinds of the higher alcohols may be combined.

Examples of higher fatty acids as the hydrophobic base component may include saturated acids [for example, $C_{10\text{-}30}$ saturated fatty acids such as myristic acid, palmitic acid, stearic acid, arachic acid, behenic acid, lignoceric acid, cerotic acid, montanoic acid, etc., preferably $C_{12\text{-}28}$ saturated fatty acids, more preferably $C_{14\text{-}26}$ saturated fatty acids, and particularly more preferably $C_{16\text{-}22}$ saturated fatty acids, etc.; oxycarbonic acids such as hydroxystearic acid; etc.], unsaturated fatty acids [for example, $C_{10\text{-}30}$ unsaturated fatty acids such as oleic acid, erucic acid, linolic acid, linolenic acid, and eleostearic acid, etc.], etc. Each of those higher fatty acids may be used alone, or two or more kinds of the higher fatty acids may be combined.

The polyhydric alcohol higher fatty acid ester is an ester of polyhydric alcohol and such a higher fatty acid, containing an unreacted hydroxyl group. Examples of such polyhydric alcohols may include alkanediols ($C_{2\text{-}10}$ alkanediols such as ethylene glycol, propylene glycol and butanediol, etc.), alkanetriols (such as glycerin, trimethylolethane, and trimethylolpropane), alkanetetraols (such as pentaerythritol, and diglycerine), alkanehexaols (such as dipentaerythritol, sorbitol, and sorbit), alkaneoctaols (such as sucrose), alkylene oxide adducts thereof (such as $C_{2\text{-}4}$ alkylene oxide adducts), etc. Each of those higher fatty acid esters may be used alone, or two or more kinds of the higher fatty acid esters may be combined.

"Oxyethylene", "ethylene oxide" or "ethylene glycol" will be expressed as "EO" below, and "oxypropylene", "propylene oxide" or "propylene glycol" will be expressed as "PO" below. Specific examples of the polyethylene glycol nonionic surfactant may include $C_{10\text{-}26}$ higher alcohol-EO-PO adducts such as poly-EO higher alcohol ethers (such as poly-EO $C_{10\text{-}26}$ alkyl ethers such as poly-EO lauryl ether and poly-EO stearyl ether), poly-EO poly-PO alkyl ethers, etc.; alkylphenol-EO adducts such as poly-EO octylphenyl ether, poly-EO nonylphenyl ether, etc.; fatty acid-EO adducts such as poly-EO monolaurate, poly-EO monooleate, poly-EO monostearate, etc.; polyhydric alcohol higher fatty acid ester-EO adducts such as glycerin mono- or di-higher fatty acid ester-EO adducts (such as EO adducts of glycerin mono- or di-$C_{10\text{-}26}$ fatty acid esters such as glycerin mono- or di-laurate, glycerin mono- or di-palmitate, glycerin mono- or di-stearate, glycerin mono- or di-olate, etc.), pentaerythritol higher fatty acid-EO adducts (such as pentaerythritol mono- to tri-$C_{10\text{-}26}$ fatty acid ester-EO adducts such as pentaerythritol distearate-EO adduct, etc.), dipentaerythritol higher fatty acid-EO adducts, sorbitol higher fatty acid ester-EO adducts, sorbit higher fatty acid-EO adducts, sorbitan fatty ester-EO adducts such as poly-EO sorbitan monolaurate, poly-EO sorbitan monostearate, and poly-EO sorbitan tristearate, sucrose higher fatty acid-EO adducts, etc.; higher alkylamine-EO adducts such as poly-EO lauryl amino ether and poly-EO stearyl amino ether; fatty acid amide-EO adducts such as poly-EO coconut oil fatty acid monoethanol amide, poly-EO lauric acid monoethanol amide, poly-EO stearic acid monoethanol amide, and poly-EO oleic acid monoethanol amide; oil or fat-EO adducts such as poly-EO castor oil, and poly-EO hardened castor oil; poly-PO-EO adducts (such as poly-EO-poly-PO block copolymers); etc. Each of those polyethylene glycol nonionic surfactants may be used alone, or two or more kinds of the polyethylene glycol nonionic surfactants may be combined.

The polyhydric alcohol nonionic surfactant is a nonionic surfactant in which a hydrophobic group of higher fatty acid or the like is combined with the aforementioned polyhydric alcohol (particularly alkanetriol to alkanehexaol such as glycerol, pentaerythritol, sucrose or sorbitol). Examples of the polyhydric alcohol nonionic surfactant may include glycerin fatty acid esters such as glycerin monostearate and glycerin monooleate, pentaerythritol fatty acid esters such as pentaerythritol monostearate and pentaerythritol di-tallow acid ester, sorbitan fatty acid esters such as sorbitan monolaurate and sorbitan monostearate, sorbitol fatty acid ethers such as sorbitol monostearate, sucrose fatty acid esters, alkyl ethers of polyhydric alcohols, fatty acid amides of alkanolamines such as coconut oil fatty acid diethanol amide, alkyl polyglycoside, etc. Each of those polyhydric alcohol nonionic surfactants may be used alone, or two or more kinds of the polyhydric alcohol nonionic surfactants may be combined.

The nonionic surfactants are preferred surfactants. Particularly the polyethylene glycol nonionic surfactant (such as poly-EO $C_{10\text{-}26}$ alkyl ethers, alkylphenol-EO adducts, polyhydric alcohol $C_{10\text{-}26}$ fatty acid ester-EO adducts, etc.) is preferred.

When the rubber component is an ethylene-α-olefin elastomer, the HLB (Hydrophile-Lipophile-Balance) value of the surfactant is, for example, 8.7 to 17, preferably 9 to 15, and more preferably 9.5 to 14 (particularly 10 to 13.5) or so. The HLB value is a value calculated by a Griffin method in the present description and the scope of claims.

The viscosity (25° C.) of the surfactant is, for example, 10 to 300 MPa·s, and preferably 20 to 200 MPa·s or so.

The ratio of the surfactant (particularly the polyethylene glycol nonionic surfactant) is, for example, 1 to 25 parts by mass, preferably 2 to 20 parts by mass, and more preferably 3 to 15 parts by mass (particularly 4 to 10 parts by mass) or so, relative to 100 parts by mass of the rubber component. When the ratio of the surfactant is too low, the noise suppression may be lowered. On the contrary, when the ratio is too high, the torque loss may increase.

(B) Plasticizer

Any plasticizer having a larger solubility parameter (SP value) than the rubber component may be used as the plasticizer. In order to improve the noise suppression, it is preferable that the plasticizer has, for example, a solubility parameter of 8.3 to 10.7 $(cal/cm^3)^{1/2}$, preferably 8.4 to 10.5 $(cal/cm^3)^{1/2}$, and more preferably 8.5 to 10 $(cal/cm^3)^{1/2}$ or so. The aforementioned solubility parameter is effective particularly when the rubber component is an ethylene-α-olefin elastomer.

A conventional plasticizer having such a solubility parameter may be used as the plasticizer. Examples of such conventional plasticizers may include an aliphatic carboxylic acid plasticizer (such as an adipic acid ester plasticizer or a sebacic acid ester plasticizer), an aromatic carboxylic acid plasticizer (such as a phthalic acid ester plasticizer or a trimellitic acid ester plasticizer), an oxycarbonic acid ester plasticizer, a phosphoric acid ester plasticizer, an ether plasticizer, an ether ester plasticizer, etc. Each of those plasticizers may be used alone, or two or more kinds of the plasticizers may be used in combination. Of the plasticizers, the ether ester plasticizer is preferred due to its great effect of improving the noise suppression when the rubber component is an ethylene-α-olefin elastomer.

Examples of the ether ester plasticizer may include poly-$C_{2-4}$ alkylene glycol di-$C_{2-18}$ fatty acid esters such as poly-EO dibutanoic acid ester, poly-EO diisobutanoic acid ester, poly-EO di-2-ethylbutyric acid ester, poly-EO di-2-ethylhexanoic acid ester, and poly-EO didecanoic acid; poly-$C_{2-4}$ alkylene oxide adducts of $C_{2-12}$ aliphatic dicarboxylic acid such as adipic acid poly-EO adduct; $C_{2-12}$ aliphatic dicarboxylic acid di($C_{1-12}$ alkoxy $C_{2-4}$ alkyl) esters such as adipic acid mono- or di-(butoxyethyl) ester, adipic acid di(2-ethylhexyloxyethyl) ester, and adipic acid di(octoxyethyl) ester; etc. Each of those ether ester plasticizers may be used alone, or two or more kinds of the ether ester plasticizers may be used in combination. Of the ether ester plasticizers, poly-$C_{2-4}$ alkylene glycol di-$C_{4-12}$ fatty acid esters such as poly-EO di-2-ethylhexanoic acid ester are preferred.

The weight average molecular weight of the plasticizer (particularly the ether ester plasticizer) is, for example, 300 to 2,000, preferably 350 to 1,500 (for example, 370 to 1,000), and more preferably 400 to 800 (particularly 450 to 600) or so in terms of polystyrene in gel permeation chromatography (GPC).

The ratio of the plasticizer (particularly the ether ester plasticizer) is, for example, 3 to 20 parts by mass (for example, 5 to 15 parts by mass), preferably 3.5 to 15 parts by mass, and more preferably 4 to 10 parts by mass (particularly 4.5 to 8 parts by mass) or so, relative to 100 parts by mass of the rubber component. When the ratio of the plasticizer is too low, the noise suppression may be lowered. On the contrary, when the ratio is too high, the torque loss may increase.

(C) Inorganic Particles

Conventional inorganic particles may be used as the inorganic particles (i.e., inorganic filler or inorganic powder). Examples of the conventional inorganic particles may include graphite, metal oxide (such as calcium oxide, barium oxide, iron oxide, copper oxide, titanium oxide, or aluminum oxide), metal carbonate (such as magnesium carbonate or calcium carbonate), metal silicate (such as calcium silicate or aluminum silicate), metal carbide (such as silicon carbide or tungsten carbide), metal nitride (such as titanium nitride, aluminum nitride, or boron nitride), metal sulfide (such as molybdenum disulfide), metal sulfate (such as calcium sulfate or barium sulfate), clay (hydrated aluminum silicate: clay composed of clay minerals, such as pyrophyllite, kaolinite, sericite, montmorillonite, bentonite, smectite, etc.), talc (hydrated magnesium silicate: inorganic particles called talcum, soapstone, or steatite, etc.), mica, alumina, silica, zeolite, diatomaceous earth, fired diatomaceous earth, activated clay, etc. Each of those inorganic particles may be used alone, or two or more kinds of the inorganic particles may be used in combination. Of them, metal carbonate of calcium carbonate, clay and talc are preferred.

The shape of each inorganic particle is not limited particularly. For example, the shape may be a spherical shape, an ellipsoidal shape, a polyhedral shape (such as a pyramid-like shape, a cubic shape, or a rectangular parallelepiped shape), a flat shape (such as a sheet-like shape, or a scaly shape), a rod-like shape, a fibrous shape, an indeterminate shape, or the like. Of those shapes, the flat shape, the indeterminate shape, etc. are generally used.

The average particle size (number average primary particle size) of the inorganic particles is, for example, 0.1 to 100 μm, preferably 1 to 50 μm, and more preferably 1 to 30 μm or so. When the size of the inorganic particles is too small, the noise suppression cannot be improved sufficiently. On the contrary, when the size is too large, the mechanical characteristics of the belt may deteriorate. In the present description and the scope of claims, the average particle size and the aspect ratio can be measured by a method for measuring dimensions based on a scanning electron micrograph taken with a magnification of 50 times, a laser diffraction scattering method, or the like.

The inorganic particles may be either non-porous or porous. The nitrogen adsorption specific surface area calculated by a BET method is, for example, 5,000 to 30,000 $cm^2/g$, and preferably 6,000 to 25,000 $cm^2/g$ or so. When the specific surface area is too small, the particles are so large that the mechanical characteristics of the belt may deteriorate. On the contrary, when the specific surface area is too large, the particles are so small that there is a fear that the noise suppression cannot be improved sufficiently.

The apparent density of the inorganic particles is, for example, 0.2 to 0.7 g/ml, and preferably 0.25 to 0.65 g/ml or so. The oil absorbing amount of the inorganic particles is 10 to 40 ml/100 g, and preferably 20 to 38 ml/100 g or so.

The ratio of the inorganic particles is, for example, 10 to 50 parts by mass, preferably 15 to 45 parts by mass (for example, 15 to 35 parts by mass), and more preferably 20 to 40 parts by mass (particularly 30 to 35 parts by mass) or so, relative to 100 parts by mass of the rubber component. When the ratio of the inorganic particles is too low, the noise suppression may be lowered. On the contrary, when the ratio is too high, the torque loss may increase.

(D) Polyethylene Resin Particles

Polyethylene resin forming the polyethylene resin particles may be polyethylene homopolymer, or may be polyethylene copolymer. Examples of copolymeric monomers contained in the copolymer may include olefins (for example, α-$C_{3-8}$ olefins such as propylene, 1-butene, 1-pentene, 1-hexene, 3-methyl-pentene, 4-methyl-pentene, 1-octene, etc.) (meth)acrylic monomers [for example, (meth)acrylic acid $C_{1-6}$ alkyl esters such as methyl (meth)acrylate, ethyl (meth)acrylate, etc.], unsaturated carboxylic acids (such as maleic anhydride), vinyl esters (such as vinyl acetate, vinyl propionate, etc.), dienes (such as butadiene, isoprene, etc.), etc. Each of those copolymeric monomers may be used alone, or two or more kinds of the copolymeric monomers may be used in combination. Of the copolymeric monomers, the α-$C_{3-8}$ olefins such as propylene, 1-butene, 1-hexene, 4-methyl-pentene, 1-octene, etc. are preferred. The ratio of the copolymeric monomers is 30 mol % or less (for example, 0.01 to 30 mol %), preferably 20 mol % or less (for example, 0.1 to 20 mol %), and more preferably 10 mol % or less (for example, 1 to 10 mol %) or so. The copolymer may be a random copolymer, a block copolymer, or the like.

Examples of the polyethylene resin may include low, medium or high density polyethylene, linear low density polyethylene, ultrahigh molecular weight polyethylene, ethylene-propylene copolymer, ethylene-butene-1 copolymer, ethylene-propylene-butene-1 copolymer, ethylene-(4-methylpentene-1) copolymer, etc. Each of those polyethylenes may be used alone, or two or more kinds of the polyethylenes may be used in combination. Of them, polyethylene such as medium or high density polyethylene or ultrahigh molecular weight polyethylene is preferred due to its great effect of improving the noise suppression.

The viscosity average molecular weight of the polyethylene resin can be, for example, selected from a range of 10,000 or more. The viscosity average molecular weight is, for example, 100,000 to 9,000,000, preferably 150,000 to 5,000,000, and more preferably 200,000 to 3,000,000 or so. When the molecular weight is too small, the effect of improving the noise suppression is not sufficient. In the present description and the scope of claims, the viscosity average molecular weight can be measured conforming to ASTM D4020.

The density of the polyethylene resin can be selected from a range of about 0.9 to 0.97 g/cm³ in a method conforming to ASTM D792. In order to enhance the effect of improving the noise suppression, the density is, for example, 0.92 to 0.97 g/cm³, preferably 0.93 to 0.97 g/cm³, and more preferably 0.94 to 0.97 g/cm³ or so.

In order to enhance the effect of improving the noise suppression, it is preferable that the melting point (or softening point) of the polyethylene resin is not lower than a temperature of processing such as kneading or rolling for the rubber composition, and not higher than a vulcanizing temperature of the rubber composition. The melting point (or softening point) is, for example, 160° C. or less (for example, 120 to 160° C.), preferably 125 to 150° C., and more preferably 125 to 140° C. or so.

The aforementioned shapes shown in the paragraph of the inorganic particles, or the like, may be used as the shape of the polyethylene resin particles. Of those shapes, particle shapes such as a spherical shape, an ellipsoidal shape, a polyhedral shape, and an indeterminate shape are generally used as the shape of the polyethylene resin particles.

The average particle size (average primary particle size) of the polyethylene resin particles is, for example, 10 to 200 μm, preferably 20 to 150 μm, and more preferably 25 to 120 μm or so. When the particle size of the polyethylene resin particles is too small, there is a fear that the noise suppression cannot be improved sufficiently. On the contrary, when the size is too large, the mechanical characteristics of the belt may deteriorate.

The ratio of the polyethylene resin particles is, for example, 1 to 30 parts by mass (for example, 5 to 20 parts by mass), preferably 3 to 20 parts by mass, and more preferably 4 to 10 parts by mass (particularly 4.5 to 8 parts by mass) or so, relative to 100 parts by mass of the rubber component. When the ratio of the polyethylene resin particles is too low, the noise suppression may be lowered. On the contrary, when the ratio is too high, the torque loss may increase.

(Reinforcer)

The rubber composition forming the compression rubber layer may further contain a reinforcer in addition to the aforementioned rubber component and the aforementioned noise suppression improver. The reinforcer may include reinforcing fiber, carbon black as strengthening agent, etc.

Examples of the reinforcing fiber may include synthetic fiber such as polyolefin fiber (such as polyethylene fiber or polypropylene fiber), polyamide fiber (such as polyamide 6 fiber, polyamide 66 fiber, polyamide 46 fiber, or aramid fiber), polyester fiber [$C_{2-4}$ alkylene $C_{6-14}$ arylate fiber such as polyethylene terephthalate (PET) fiber or polyethylene naphthalate (PEN) fiber, etc.], vinylon fiber, polypara-phenylenebenzobisoxazole (PBO) fiber, etc.; natural fiber such as cotton, hemp or wool; and inorganic fiber such as carbon fiber. Each of those fibers may be used alone, or two or more kinds of the fibers may be used in combination.

Of those reinforcing fibers, at least one kind selected from polyamide fibers such as polyamide 66 fiber or aramid fiber, polyester fiber, vinylon fiber, etc. is preferred. The reinforcing fiber may be fibrillated. Further, various bonding treatments may be also performed on the reinforcing fiber in the same manner as the cord.

The reinforcing fiber typically having a form of short fiber may be contained in the compression rubber layer. The average length of the short fiber may be, for example, 0.1 to 20 mm, preferably 0.5 to 15 mm (for example, 1 to 10 mm), and more preferably 1 to 5 mm (particularly 2 to 4 mm) or so. The short fiber is oriented in the belt width direction in the compression rubber layer, which largely receives lateral pressure and frictional force from the pulley, so that lateral pressure resistance can be secured in the V-ribbed belt. The average fiber diameter of the reinforcing fiber is, for example, 1 to 100 μm, preferably 3 to 50 μm, and more preferably 5 to 40 μm (particularly 10 to 30 μm) or so.

Preferably the carbon black contains carbon black having a large particle size, particularly large-particle-size carbon black having an iodine adsorbing amount of 40 mg/g or less in order to suppress internal heating in the rubber composition forming the compression rubber layer to thereby improve the fuel economy. Examples of the large-particle-size carbon black may include FEF, GPF, APF, SRF-LM, SRF-HM, etc. Each of those carbon blacks may be used alone, or two or more kinds of the carbon blacks may be used in combination. The number average primary particle size of the large-particle-size carbon black may be, for example, 40 to 200 nm, preferably 45 to 150 nm, and more preferably 50 to 125 nm or so.

The reinforcing effect of the large-particle-size carbon black is low. It is therefore preferable to together use small-particle-size carbon black (having iodine adsorbing amount of higher than 40 mg/g), which is small in particle size and high in reinforcing effect. When at least two kinds of carbon blacks different in particle size are used, it is possible to make the fuel economy and the reinforcing effect compatible. Examples of the small-particle-size carbon black may include SAF, ISAF-HM, ISAF-LM, HAF-LS, HAF, HAF-HS, etc. Each of those carbon blacks may be used alone, or two or more kinds of the carbon blacks may be used in combination. The number average primary particle size of the small-particle-size carbon black may be less than 40 nm, for example, 5 to 38 nm, preferably 10 to 35 nm, and more preferably 15 to 30 nm or so.

The ratio of the average particle size of the large-particle-size carbon black to the average particle size of the small-particle-size carbon black may be 1.5/1 to 3/1, preferably 1.7/1 to 2.7/1, and more preferably 1.8/1 to 2.5/1 or so.

The mass ratio of the large-particle-size carbon black to the small-particle-size carbon black may be within a range where the fuel economy and the reinforcing effect can be made compatible, for example, 20/80 to 55/45, preferably 25/75 to 50/50, and more preferably 30/70 to 50/50 or so. When the ratio of the small-particle-size carbon black is too high in the carbon black as a whole, the fuel economy may deteriorate. When the ratio of the large-particle-size carbon black is too high, the reinforcing effect may deteriorate.

The ratio of the reinforcer may be not lower than 40 parts by mass, for example, 50 to 200 parts by mass, preferably 60 to 180 parts by mass, and more preferably 80 to 150 parts by mass (particularly 100 to 120 parts by mass) or so, relative to 100 parts by mass of the rubber component. According to the present invention, the torque loss can be reduced even when the ratio of the reinforcer is high.

The ratio of the reinforcing fiber may be not higher than 80 parts by mass (for example, 0 to 80 parts by mass), for example, not higher than 60 parts by mass (for example, 1 to 60 parts by mass), preferably not higher than 50 parts by mass (for example, 5 to 50 parts by mass), and more preferably not higher than 40 parts by mass (for example, 10 to 40 parts by mass) or so, relative to 100 parts by mass of the rubber component. When the ratio of the reinforcing fiber is too high, there is a fear that the torque loss cannot be reduced.

The ratio of the carbon black may be not lower than 10 parts by mass, for example, 20 to 180 parts by mass, preferably 30 to 150 parts by mass, and more preferably 50 to 120 parts by mass (particularly 60 to 100 parts by mass) or so, relative to 100 parts by mass of the rubber component.

(Another Plasticizer)

The rubber composition forming the compression rubber layer may further contain another plasticizer (or softener) having solubility parameter of not higher than the solubility parameter of the rubber component, in addition to the aforementioned rubber component and the aforementioned noise suppression improver. When the rubber component is an ethylene-α-olefin elastomer, the other plasticizer may be a plasticizer having solubility parameter of, for example, 6.0 to 8.1 $(cal/cm^3)^{1/2}$, preferably 6.5 to 8.0 $(cal/cm^3)^{1/2}$, and more preferably 7.0 to 7.8 $(cal/cm^3)^{1/2}$ or so. Examples of the other plasticizer may include oils such as paraffin oil, naphthene-based oil, process oil, etc.

The ratio of the other plasticizer (or softener) may be not higher than 30 parts by mass, for example, 1 to 30 parts by mass, preferably 3 to 25 parts by mass, and more preferably 5 to 20 parts by mass (particularly 7 to 15 parts by mass) or so, relative to 100 parts by mass of the rubber component.

(Vulcanizer and Co-Cross-Linking Agent)

The rubber composition forming the compression rubber layer may further contain a vulcanizer in addition to the aforementioned rubber component and the aforementioned noise suppression improver.

Conventional components can be used as the vulcanizer (or cross-linking agent) in accordance with the kind of the rubber component. Examples of the conventional components include organic peroxides (such as diacyl peroxide, peroxy ester, dialkyl peroxide, etc.), oximes (such as quinone dioxime, etc.), guanidines (such as diphenylguanidine, etc.), metal oxides (such as magnesium oxide, zinc oxide, etc.), sulfur-based vulcanizers, etc. Each of those vulcanizers may be used alone, or two or more kinds of the vulcanizers may be used in combination. When the rubber component is an ethylene-α-olefin elastomer, organic oxides, sulfur-based vulcanizers, etc. are generally used as the vulcanizer.

The ratio of the vulcanizer can be selected within a range of about 1 to 20 parts by mass relative to the 100 parts by mass of the rubber component in accordance with the kind of the vulcanizer and the kind of the rubber component. For example, the ratio of organic peroxide as the vulcanizer is 1 to 8 parts by mass, preferably 1.5 to 5 parts by mass, and more preferably 2 to 4.5 parts by mass or so, relative to 100 parts by mass of the rubber component.

The rubber composition forming the compression rubber layer may further contain a co-cross-inking agent such as bismaleimides (e.g., arene bismaleimides such as N,N'-m-phenylenedimaleimide, or aromatic bismaleimides).

The ratio of the co-cross-linking agent can be selected from a range of about 0.01 to 10 parts by mass relative to 100 parts by mass of the rubber component. For example, the ratio is 0.1 to 10 parts by mass, preferably 0.5 to 6 parts by mass, and more preferably 1 to 5 parts by mass or so.

(Other Additives)

The rubber composition forming the compression rubber layer may contain a conventional additive as further another additive in addition to the aforementioned rubber component and the aforementioned noise suppression improver.

Examples of the conventional additive may include a vulcanization accelerator, a vulcanization retardant, a processing agent or a processing aid (such as stearic acid, metal stearate, wax, paraffin, aliphatic acid amide, etc.), a stabilizer or an antiaging agent (such as an ultraviolet absorber, an antioxidant, an anti-thermal aging agent or a thermal stabilizer, a flex cracking inhibitor, an antiozonant, etc.), a colorant, an adhesion improver [resorcin-formaldehyde co-condensate, melamine resin such as hexamethoxymethyl-melamine, co-condensate of those (such as resorcin-melamine-formaldehyde co-condensate), etc.], a tackifier, a plasticizer, a coupling agent (such as a silane coupling agent), a lubricant, a flame retardant, an antistatic agent, etc. Each of those additives may be used alone, or two or more kinds of the additives may be used in combination.

The ratios of the other additives can be selected from their conventional ranges in accordance with the kinds thereof. For example, each ratio may be about 0.1 to 5 parts by mass (particularly 0.5 to 3 parts by mass) relative to 100 parts by mass of the rubber component.

[Method for Manufacturing V-Ribbed Belt]

A method for manufacturing the V-ribbed belt according to the present invention is not limited particularly, but a well-known or conventional method can be used. For example, the V-ribbed belt can be formed in the following manner. That is, a compression rubber layer, an adhesive layer in which a tension member is embedded, and an extension layer are formed out of unvulcanized rubber compositions respectively, and stacked on one another. A laminate formed thus is formed into a cylindrical shape by a shaping mold, and vulcanized to form a sleeve. The vulcanized sleeve is cut into a predetermined width, and thus the V-ribbed belt is formed. More in detail, the V-ribbed belt can be manufactured in the following method.

(First Manufacturing Method)

First, a sheet for an extension layer is wound on a cylindrical shaping mold having a smooth surface. A cord (twisted cord) for forming a tension member is spun spirally on the sheet. Further, a sheet for an adhesive layer and a sheet for a compression rubber layer are wound sequentially to produce a molded body. After that, a vulcanizing jacket is put on the molded body, and the mold (i.e., shaping mold) is received in a vulcanizing can. After vulcanized on predetermined vulcanization conditions, the molded body is released from the shaping mold to obtain a cylindrical vulcanized rubber sleeve. The external surface (i.e., compression rubber layer) of the vulcanized rubber sleeve is ground by a grinding wheel to form a plurality of ribs. The vulcanized rubber sleeve is then cut with a cutter into a predetermined width in a belt longitudinal direction to be thereby finished into a V-ribbed belt. Incidentally, when the cut belt is reversed, a V-ribbed belt provided with a compression rubber layer having rib portions in its inner circumferential surface can be obtained.

(Second Manufacturing Method)

First, a cylindrical inner mold mounted with a flexible jacket in its outer circumferential surface is used as an inner mold, and an unvulcanized sheet for an extension layer is wound on the flexible jacket in the outer circumferential surface. A cord for forming a tension member is spun spirally on the sheet. Further, an unvulcanized sheet for a compression rubber layer is wound to produce a laminate. Next, a cylindrical outer mold in which a plurality of rib molds have been craved in its inner circumferential surface is used as an outer mold which can be attached to the inner mold. The inner mold on which the laminate is wound is placed in the outer mold coaxially. After that, the flexible jacket is expanded toward the inner circumferential surface (i.e., rib molds) of the outer mold to thereby press the laminate (compression rubber layer) into the rib molds. The laminate is vulcanized. The inner mold is then extracted from the outer mold, and a vulcanized rubber sleeve having a plurality of ribs is released from the outer mold. After that, the vulcanized rubber sleeve is cut with a cutter into a predetermined width in a belt longitudinal direction to be thereby finished into a V-ribbed belt. In the second manufacturing method, the laminate having the extension layer, the tension member and the compression rubber layer can be expanded at a time to be thereby finished into a sleeve (or a V-ribbed belt) having a plurality of ribs.

(Third Manufacturing Method)

With respect to the second manufacturing method, for example, a method disclosed in JP-A-2004-82702 (i.e., a method in which only the compression rubber layer is expanded to form a preformed body (which is semi-vulcanized), and next the extension layer and the tension member are expanded to be crimped to the preformed body, and vulcanized to be integrated and finished into a V-ribbed belt) may be used.

EXAMPLES

The present invention will be described below in detail based on examples. However, the present invention is not limited by the examples. In the following examples, raw materials used in the examples, measuring methods and evaluation methods for respective physical properties will be shown below. Unless otherwise specifically noted, "parts" and "%" will be expressed on a mass basis.

[Raw Materials]

EPDM: "EPT2060M" manufactured by Mitsui Chemicals, Inc.

Nylon short fiber: 66 nylon, average fiber diameter 27 μm, average fiber length 3 mm Cotton short fiber: denim, average fiber diameter 13 μm, average fiber length 6 mm Zinc oxide: "Three Kinds of Zinc Oxides" manufactured by Seido Chemical Industry Co., Ltd.

Stearic acid: "STEARIC ACID CAMELLIA" manufactured by NOF Corporation

Carbon black HAF: "SEAST 3" manufactured by Tokai Carbon Co., Ltd., average particle size 28 nm Carbon black FEF: "SEAST SO" manufactured by Tokai Carbon Co., Ltd., average particle size 43 nm Hydrated silica: "Nipsil VN3" manufactured by Tosoh Silica Corporation Paraffin oil (softener): "Diana Process Oil PW-90" manufactured by Idemitsu Kosan Co., Ltd.

Surfactant: polyoxyalkylene alkyl ether, "Newcol 2304-Y" manufactured by Nippon Nyukazai Co., Ltd.

Ether ester plasticizer: "RS-700" manufactured by ADEKA Corporation

Calcium carbonate: "Whiton SSB" manufactured by Shiraishi Calcium Kaisha Ltd.

Clay (kaolinite): "HARD TOP CLAY" manufactured by Shiraishi Calcium Kaisha Ltd.

Clay (montmorillonite): "BEN-GEL A" manufactured by HOJUN Co., Ltd.

Talc: "RL217" manufactured by Fuji Talc Industrial Co., Ltd., median diameter 20 μm Polyethylene particles: "HI-ZEX MILLION 240S" manufactured by Mitsui Chemicals, Inc.

Organic peroxide: "PERCUMYL D-40" manufactured by NOF Corporation

Vulcanization accelerator A: tetramethylthiuram disulfide (TMTD)

Vulcanization accelerator B: N-cyclohexyl-2-benzothiazyl-sulfenamide (CBS)

Co-cross-linking agent A: p,p'-dibenzylquinone dioxime, "VULNOC DGM" manufactured by Ouchi Shinko Chemical Industrial Co., Ltd.

Co-cross-linking agent B: N,N'-m-phenylenedimaleimide, "VULNOC PM" manufactured by Ouchi Shinko Chemical Industrial Co., Ltd.

Cord: twisted cord prepared by twisting (organzine) 1,000-denier PET fiber in a twist configuration of 2×3 with an final twisting coefficient of 3.0 and a primary twisting coefficient of 3.0, and subjecting the obtained cord having a total denier of 6,000 to a bonding treatment; cord diameter of 1.0 mm Examples 1 to 22 and Comparative Examples 1 to 18

(Manufacturing V-Ribbed Belt)

A rubber composition for forming an extension layer, a rubber composition for forming a compression rubber layer and a rubber composition for forming an adhesive layer shown in Tables 1 and 2 were kneaded using a well-known method such as Banbury mixer. The kneaded rubber was passed through calender rolls to produce an extension layer forming sheet, a compression rubber layer forming sheet and an adhesive layer forming sheet with predetermined thicknesses.

TABLE 1

(rubber compositions for extension layer and adhesive layer)

| | Material | Extension layer | Adhesive layer |
|---|---|---|---|
| Composition (parts by mass) | EPDM | 100 | 100 |
| | Nylon short fiber | 15 | 0 |
| | Cotton short fiber | 20 | 0 |
| | Zinc oxide | 5 | 5 |
| | Stearic acid | 1 | 1 |
| | Carbon black HAF | 50 | 40 |
| | Hydrated silica | 0 | 20 |
| | Paraffin oil | 10 | 8 |
| | Resorcin-formalin copolymer | 0 | 2 |
| | Antiaging agent | 2 | 2 |
| | Organic peroxide | 5 | 0 |
| | Sulfur | 0 | 1 |
| | Vulcanization accelerator A | 0 | 1 |
| | Vulcanization accelerator B | 0 | 1 |
| | Hexamethoxymethylolmelamine | 0 | 4 |
| | Co-cross-linking agent A | 2 | 0 |

TABLE 2

(composition for compression rubber layer)

| | Composition No. (parts by mass) | | | | | | | | | | | | | | | | |
|---|---|---|---|---|---|---|---|---|---|---|---|---|---|---|---|---|---|
| | A | B | C | D | E | F | G | H | I | J | K | L | M | N | O | P | Q |
| EPDM | 100 | 100 | 100 | 100 | 100 | 100 | 100 | 100 | 100 | 100 | 100 | 100 | 100 | 100 | 100 | 100 | 100 |
| Nylon short fiber | 30 | 30 | 30 | 30 | 30 | 30 | 30 | 30 | 30 | 30 | 30 | 30 | 30 | 30 | 30 | 30 | 30 |
| Carbon black HAF | 40 | 40 | 40 | 40 | 40 | 40 | 40 | 40 | 40 | 40 | 40 | 40 | 40 | 40 | 40 | 40 | 40 |
| Carbon black FEF | 35 | 35 | 35 | 35 | 35 | 35 | 30 | 20 | 25 | 20 | 25 | 20 | 25 | 20 | 25 | 20 | 35 |
| Paraffin oil | 18 | 7 | — | 10 | 5 | — | 10 | 10 | 10 | 10 | 10 | 10 | 10 | 10 | 10 | 10 | 20 |
| Surfactant | 2 | 5 | 20 | — | — | — | — | — | — | — | — | — | — | — | — | — | — |
| Ether ester plasticizer | — | — | — | 5 | 10 | 15 | — | — | — | — | — | — | — | — | — | — | — |
| Calcium carbonate | — | — | — | — | — | — | 15 | 30 | — | — | — | — | — | — | — | — | — |
| Clay (kaolinite) | — | — | — | — | — | — | — | — | 20 | 35 | — | — | — | — | — | — | — |
| Clay (montmorillonite) | — | — | — | — | — | — | — | — | — | — | 20 | 35 | — | — | — | — | — |
| Talc | — | — | — | — | — | — | — | — | — | — | — | — | 20 | 35 | — | — | — |
| Polyethylene particles | — | — | — | — | — | — | — | — | — | — | — | — | — | — | 5 | 20 | — |
| Organic peroxide | 5 | 5 | 5 | 5 | 5 | 5 | 5 | 5 | 5 | 5 | 5 | 5 | 5 | 5 | 5 | 5 | 5 |
| Co-cross-linking agent B | 2 | 2 | 2 | 2 | 2 | 2 | 2 | 2 | 2 | 2 | 2 | 2 | 2 | 2 | 2 | 2 | 2 |

Next, a V-ribbed belt was produced using the following well-known method. First, a sheet for an extension layer was wound on a cylindrical shaping mold having a smooth surface. A cord (twisted cord) for forming a tension member was spun spirally on the sheet for the extension layer. A sheet for an adhesive layer and a sheet for a compression rubber layer were wound sequentially to form a molded body. After that, a vulcanizing jacket was put on the molded body. In this state, the shaping mold was placed in a vulcanizing can. After vulcanized on conditions at a temperature of 160° C. and for 30 minutes, the molded body was released from the shaping mold to obtain a cylindrical vulcanized rubber sleeve. The external surface (i.e., compression rubber layer) of the vulcanized rubber sleeve was ground by a grinding wheel to form a plurality of ribs at predetermined intervals. The vulcanized rubber sleeve was then cut with a cutter into a predetermined width in a belt longitudinal direction to be thereby finished into a V-ribbed belt.

(Dimensions of V-Ribbed Belt)

Figure 5:
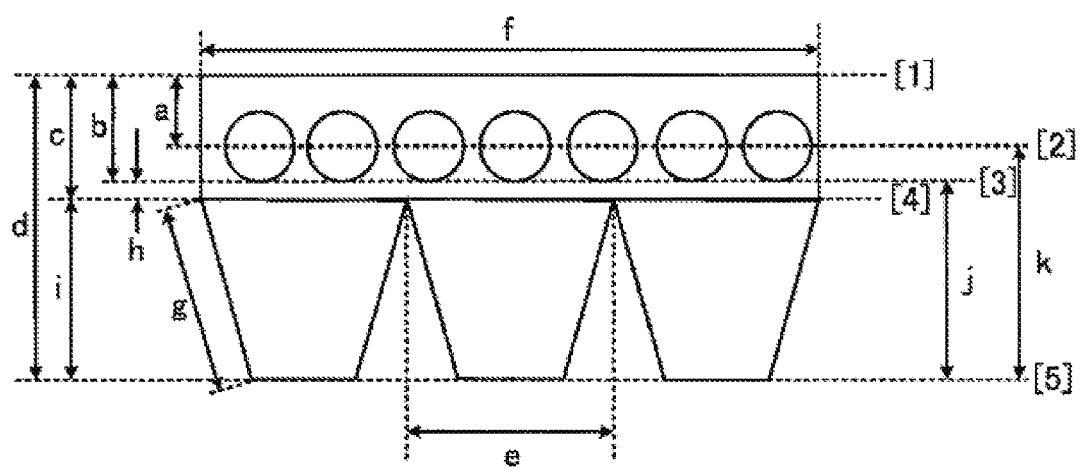
FIG. 5 is a schematic view for illustrating dimensions of a V-ribbed belt used in each Example.

The obtained V-ribbed belt was adjusted as shown in FIG. 5 and Table 3, so that a distance a from a cord center [2] to a V-ribbed belt back [1] was 1.00 mm, a distance b from a cord bottom [3] to the V-ribbed belt back [1] was 1.50 mm, a distance c from a rib bottom [4] to the V-ribbed belt back [1] was 2.30 mm, a distance d from a rib top end [5] to the V-ribbed belt back [1] was 4.30 mm, a rib pitch e was 3.56 mm, a distance h from the cord bottom [3] to the rib bottom [4] was 0.80 mm, a distance i from the rib top end [5] to the rib bottom [4] was 2.00 mm, and a distance j from the rib top end [5] to the cord bottom [3] was 2.80 mm.

TABLE 3

| V-ribbed belt dimensions (mm) | |
|---|---|
| a | 1.00 |
| b | 1.50 |
| c | 2.30 |
| d: Total thickness | 4.30 |
| e: Rib width | 3.56 |
| f: Belt width | (e) × (number of ribs) |
| h | 0.80 |
| i: Rib height | 2.00 |
| j | 2.80 |

[Measuring Friction Loss (Torque Loss)]

Figure 6:
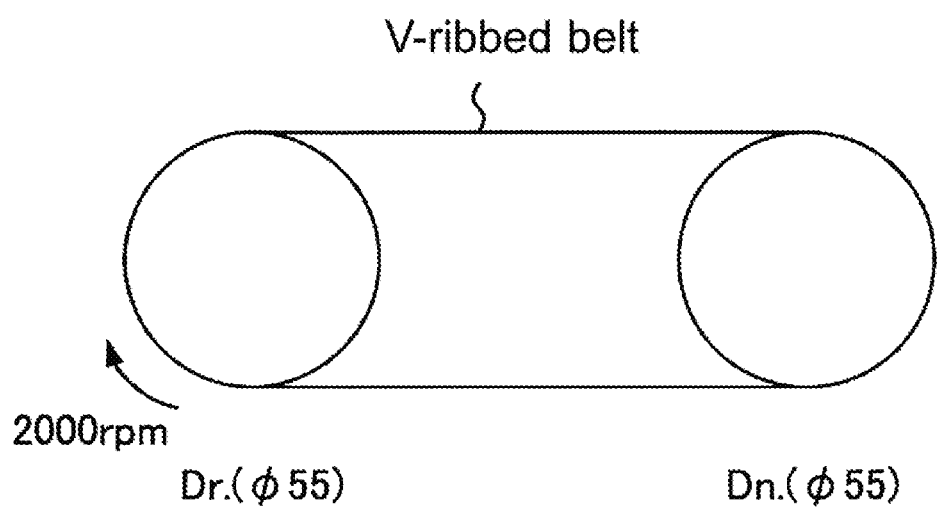
FIG. 6 is a schematic view for illustrating a method for measuring friction loss in the V-ribbed belt in each Example.

As shown in FIG. 6, a V-ribbed belt (having four ribs, and 750 mm long) was wound on a biaxial running testing machine constituted by a driving (Dr) pully having a diameter of 55 mm and a driven (Dn) pulley having a diameter of 55 mm. Predetermined initial tension was applied to the V-ribbed belt within a tension range of 100 to 600 N per belt, and the driving pulley was rotated at 2,000 rpm with no load on the driven pulley. A difference between driving torque and driven torque at that time was calculated as torque loss. Obtained results are shown in Tables 4 to 6. Tables show torque loss obtained when initial tension of 500 N was applied.

The torque loss obtained by this measurement includes not only torque loss caused by bending loss of the V-ribbed belt but also torque loss caused by a bearing of the testing machine. Therefore, a metal belt (made of maraging steel) in which torque loss as a V-ribbed belt was estimated to be substantially zero was set to run in advance. A difference between driving torque and driven torque at that time was regarded as torque loss caused by the bearing (i.e., bearing loss). Thus, a value obtained by subtracting the torque loss caused by the bearing from the torque loss calculated by the running of the V-ribbed belt (i.e., torque loss caused by both the V-ribbed belt and the bearing) was obtained as torque loss caused by the V-ribbed belt alone. Here, the torque loss (i.e., bearing loss) to be subtracted is a torque loss obtained by the metal belt running with predetermined initial tension (for example, torque loss obtained by the metal belt running with the same initial tension as the initial tension of 500 N per belt applied to the V-ribbed belt which is running). As the torque loss of the V-ribbed belt obtained thus is smaller, the fuel economy is more excellent. From the viewpoint of fuel economy in an automobile engine, it is preferable that the torque loss is reduced to 0.24 N·m or less.

[Noise Suppression Test (Measuring Sounding in Real Vehicle]

Figure 7:
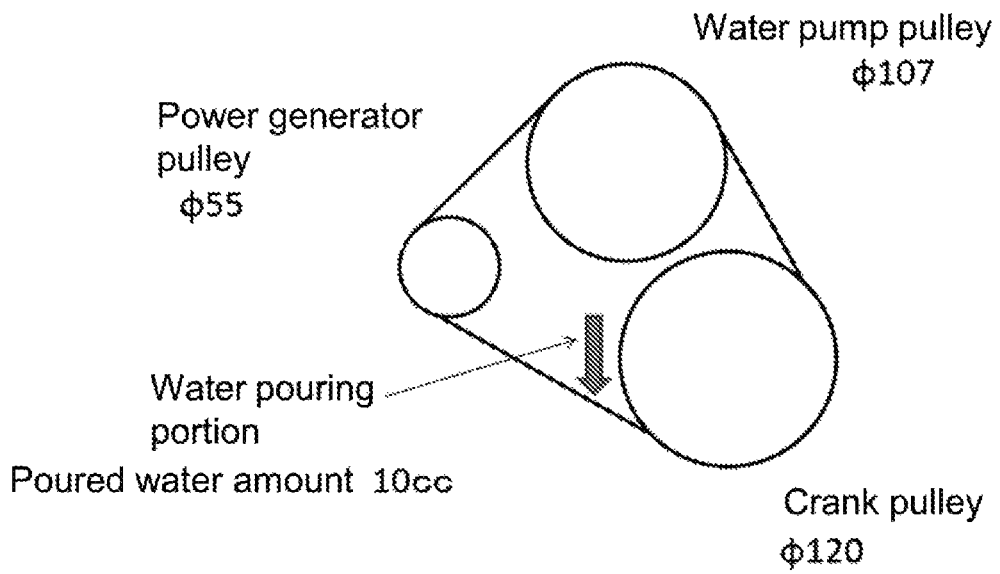
FIG. 7 is a schematic view for illustrating a noise suppression test (here, measuring sound in a real vehicle) for the V-ribbed belt in each Example.

Using an engine of a real vehicle, a V-ribbed belt was wound on a water pump pulley (diameter 107 mm), a crank pulley (diameter 120 mm) and a power generator pulley (diameter 55 mm) in the layout shown in FIG. 7. On conditions that belt tension was 300 N per belt, a load on the power generator was 70 A, and the crank rotational frequency was idling, occurrence of stick-slip abnormal noise in the V-ribbed belt (having four ribs, and 750 mm long) submerged in water poured thereto was checked, and evaluated in the following criteria. Results are shown in Tables 4 to 6.

A: no abnormal noise
B: very small abnormal noise within 3 seconds (practically unproblematic level)
C: small abnormal noise within 3 seconds (the noise is audible in an engine room, but not audible within the interior of the vehicle. It is no good if high-level silence is requested, but normally in unproblematic level.)
D: abnormal noise generated continuously for three or more seconds

[Noise Suppression Test (Measuring Misalignment Sounding]

Figure 8:
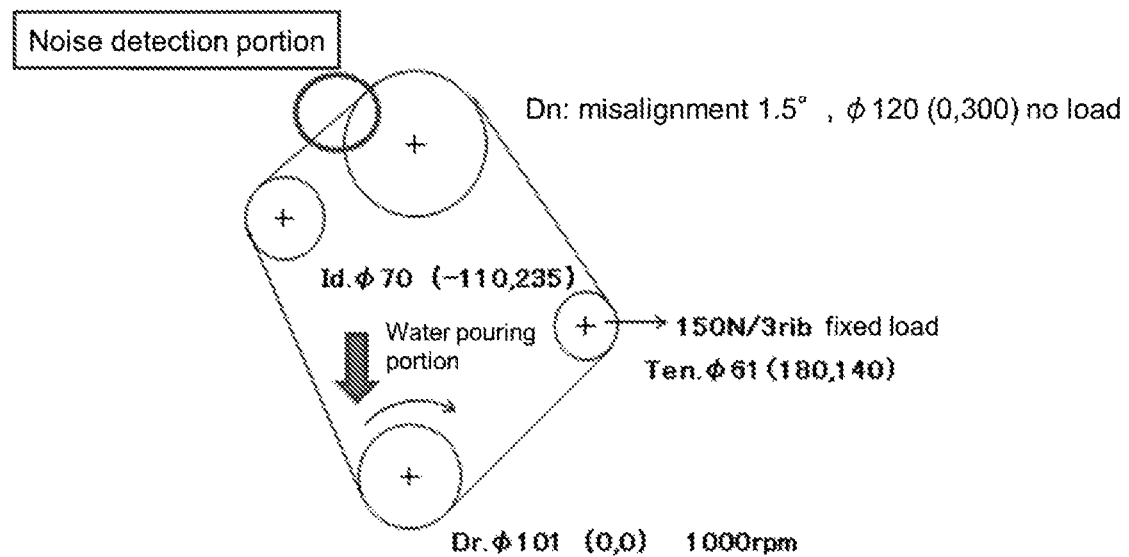
FIG. 8 is a schematic view for illustrating a noise suppression test (measuring misalignment sound) for the V-ribbed belt in each Example.

The noise suppression was also evaluated by a misalignment sounding test. As shown in FIG. 8, a testing machine used for the evaluation had a configuration in which a driving (Dr) pulley (diameter 101 mm), an idler (Id) pulley (diameter 70 mm), a driven (Dn) pulley (diameter 120 mm), and a tension (Ten) pulley (diameter 61 mm) were disposed, and misalignment was set at an angle of 1.5° between the driving pulley and the driven pulley. A V-ribbed belt (having six ribs, and 1,200 mm long) was wound on the pulleys in the testing machine. On conditions at 25° C., the V-ribbed belt was set to run with the driving pulley driving at a rotational frequency of 1,000 rpm. A load was applied to the driving pulley so that the belt tension at that time reached 50 N per rib. Occurrence of stick-slip abnormal noise (abnormal noise heard squeaky) generated when water was poured to the belt at 100 ml/min for one minute was checked, and evaluated in the same criteria as in the measurement of sounding in the real vehicle. Results are shown in Tables 4 to 6.

[Sticking Wear Test of Rib Bottom]

Figure 9:
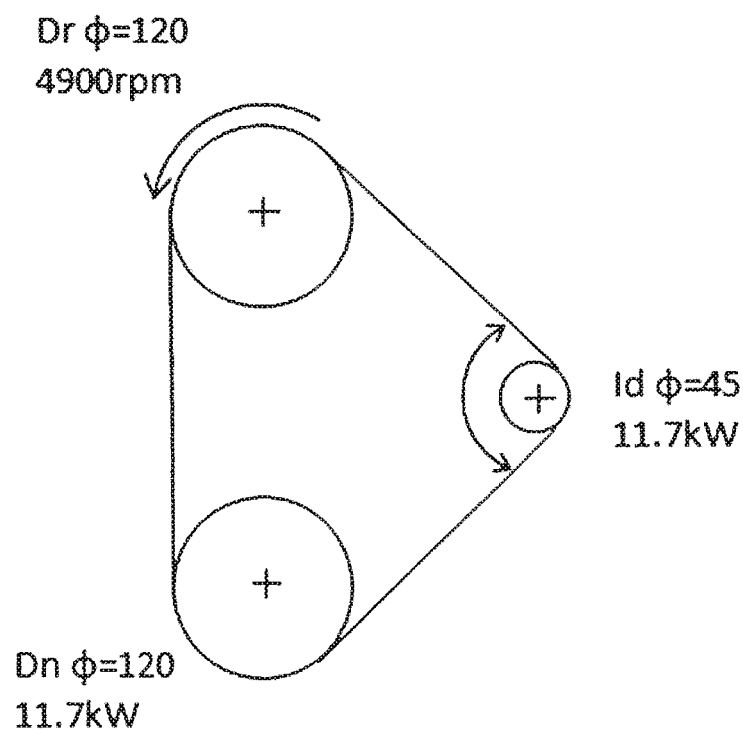
FIG. 9 is a schematic view for illustrating a sticking wear test for a rib bottom portion of the V-ribbed belt in each Example.

A sticking wear test was performed using a testing machine in which a driving (Dr) pulley (diameter 120 mm), an idler (Id) pulley (diameter 45 mm), and a driven (Dn) pulley (diameter 120 mm) were disposed sequentially as in the layout shown in FIG. 9. In detail, a V-ribbed belt (having four ribs, and 1,200 mm long) was wound on the respective pulleys in the testing machine, and the belt was set to run at an atmospheric temperature of 25° C. for 5 hours with belt initial tension (940 N per four ribs) under the conditions that the rotational frequency of the driving pulley was 4,900 rpm, and a load on the idler pulley and the driven pulley was set at 11.7 kW. Occurrence of sticking wear (abnormal noise heard stickily due to sticking) at the bottom (rib bottom) of each V-rib portion after the running was evaluated in the following criteria. Results are shown in Tables 4 to 6.

A: no sticking wear
B: very small sticking wear, but unproblematic level on running performance
D: sticking wear in problematic level against running

TABLE 4

| | Examples | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Composition No. of compression rubber layer | A | B | C | D | E | F | G | H | I | J | K | L | M | N | O | P |
| V-rib angle $\alpha$ (°) | | | | | | | | | 43 | | | | | | | |
| Pulley V-groove angle $\beta$ (°) | | | | | | | | | 36 | | | | | | | |
| Angle difference $\alpha - \beta$ (°) | | | | | | | | | 7 | | | | | | | |
| Torque loss (N · m) at tension of 500N | 0.20 | 0.21 | 0.23 | 0.20 | 0.21 | 0.23 | 0.22 | 0.23 | 0.22 | 0.23 | 0.22 | 0.23 | 0.23 | 0.24 | 0.24 | 0.23 |
| Noise suppression (real vehicle test) | B | A | A | A | A | A | C | B | C | B | C | B | C | B | C | C |
| Noise suppression (misalignment test) | A | A | A | A | A | A | C | B | C | B | C | B | C | B | B | B |
| Sticking wear in rib bottom | A | A | A | A | A | A | A | A | A | A | A | A | A | A | A | A |

TABLE 5

| | Examples | | | | | |
|---|---|---|---|---|---|---|
| | 17 | 18 | 19 | 20 | 21 | 22 |
| Composition No. of compression rubber layer | B | | E | | H | |
| V-rib angle $\alpha$ (°) | 41 | 45 | 41 | 45 | 41 | 45 |
| Pulley V-groove angle $\beta$ (°) | | | 36 | | | |
| Angle difference $\alpha - \beta$ (°) | 5 | 9 | 5 | 9 | 5 | 9 |
| Torque loss (N · m) at tension of 500N | 0.23 | 0.21 | 0.23 | 0.21 | 0.22 | 0.21 |
| Noise suppression (real vehicle test) | A | A | A | A | B | B |
| Noise suppression (misalignment test) | A | A | A | A | B | B |
| Sticking wear in rib bottom | A | B | A | B | A | B |

TABLE 6

| | Comparative Examples | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Composition No. of compression rubber layer | | Q | | A | | B | | D | | E | | G | I | K | M | O | B | E |
| V-rib angle a (°) | 40 | 40 | 43 | 40 | 40 | 40 | 40 | 40 | 40 | 40 | 40 | 40 | 40 | 40 | 40 | 40 | 46 | 46 |
| Pulley V-groove angle b (°) | 40 | 36 | 36 | 40 | 36 | 40 | 36 | 40 | 36 | 40 | 36 | 36 | 36 | 36 | 36 | 36 | 36 | 36 |
| Angle difference a − b (°) | 0 | 4 | 7 | 0 | 4 | 0 | 4 | 0 | 4 | 0 | 4 | 4 | 4 | 4 | 4 | 4 | 10 | 10 |
| Torque loss (N × m) at tension of 500N | 0.26 | 0.23 | 0.21 | 0.34 | 0.30 | 0.33 | 0.30 | 0.33 | 0.31 | 0.34 | 0.30 | 0.30 | 0.31 | 0.30 | 0.30 | 0.30 | 0.21 | 0.21 |
| Noise suppression (real vehicle test) | D | D | D | A | A | A | A | A | A | A | A | C | C | C | C | C | A | A |
| Noise suppression (misalignment test) | D | D | C | A | A | A | A | A | A | A | A | C | C | C | C | B | A | A |
| Sticking wear in rib bottom | A | A | A | A | A | A | A | A | A | A | A | A | A | A | A | A | D | D |

As is apparent from the results in Tables 4 to 6, in Comparative Examples 4 to 16 in which a rubber composition high in internal loss (i.e., tan δ) was used and the angle difference α-β did not reach 5° to 9°, the value of torque loss increased to be 0.30 to 0.34 N·m. On the other hand, in Examples 1 to 22 in which the angle difference α-β was within the range of from 5° to 9° even when a rubber composition high in internal loss (i.e., tan δ) was used, the value of torque loss decreased to be 0.20 to 0.24 N·m. In addition, in Comparative Examples 1 to 3 in which a rubber composition low in internal loss (i.e., tan δ) was used, the torque loss was reduced independently of the angle difference α-β. Further, in Examples 18, 20 and 22 in which the angle difference α-β was 9°, very small sticking wear occurred, but it was in unproblematic level on running performance. On the other hand, in Comparative Examples 17 and 18 in which the angle difference α-β exceeded 9°, sticking wear occurred in problematic level against running The difference between the level where the torque loss is "0.30 to 0.34 N·m" and the level where the torque loss is "0.20 to 0.24 N·m", that is, reduction of "0.06 to 0.14 N·m" in torque loss is, for example, a significant difference corresponding to improvement of 0.2% in fuel consumption of a light car (improvement of 0.1% in fuel consumption is a large effect in the automobile field).

In Examples 1 to 6 and 17 to 20 and Comparative Examples 4 to 11 and 17 to 18 in which a rubber composition combined with a plasticizer or a surfactant was used, no stick-slip abnormal noise occurred (i.e., level of A or B). In Examples 7 to 16 and 21 to 22 and Comparative Examples 12 to 16 in which a rubber composition combined with inorganic filler or polyethylene particles was used, occurrence of stick-slip abnormal noise was inferior to that in use of the plasticizer or the surfactant but it is insignificant (i.e., level of B or C). On the other hand, in Comparative Examples 1 to 3 where such an agent was not used, stick-slip abnormal noise occurred.

From the above results, in a driving apparatus in which each of the V-ribbed belts according to Examples 1 to 22 was combined with V-pulleys, it was confirmed that it is possible to improve the fuel economy (i.e., reduce torque loss) while keeping the noise suppression (i.e., silence).

[Simulation of Torque Loss by FEM Analysis]

Figure 10:
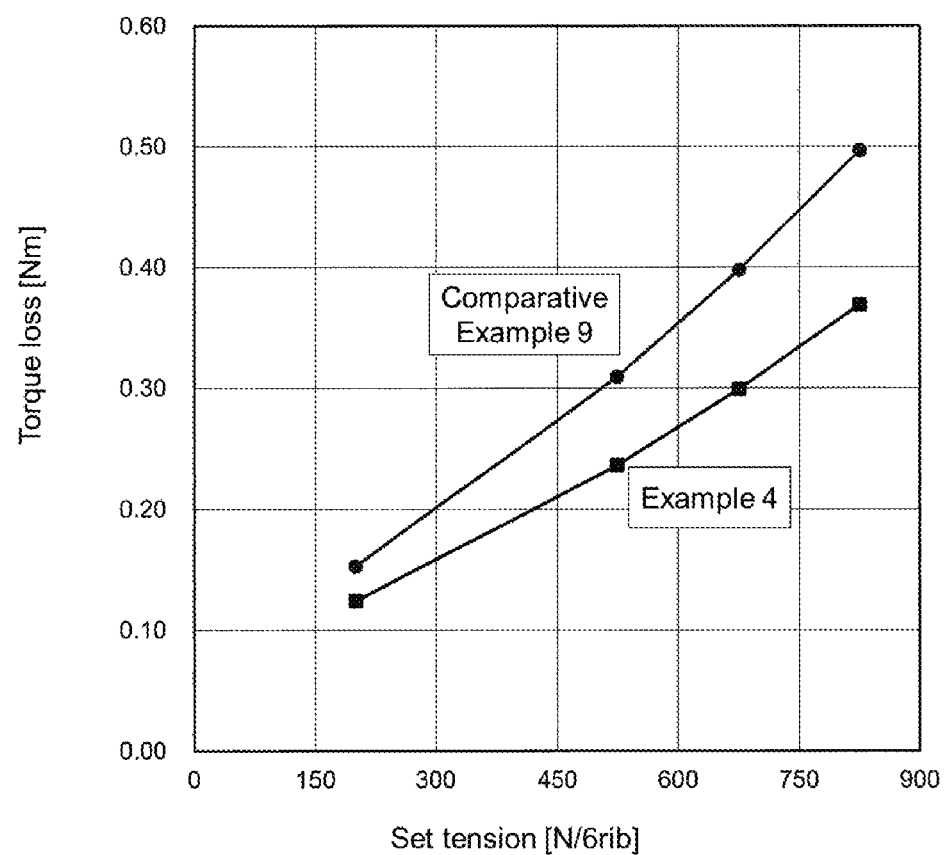
FIG. 10 is a graph showing a simulation result of torque loss by FEM analysis for Example 4 and Comparative Example 9.

On the conditions of Example 4 (5 parts by weight of plasticizer, α=43°, β=36°) and Comparative Example 9 (5 parts by weight of plasticizer, α=40°, β=36°), an analytic model between a V-ribbed belt and each of V-pulleys was created, and energy caused by compressive strain, which serves as an index of energy loss caused by heating, was analyzed by computer simulation. Results of the analysis are shown in FIG. 10. It is understood that in Example 4 in which the angle difference α-β is large so that a gap with the pulley appears in an end portion of each V-rib, energy caused by compressive strain near the end portion of the V-rib is smaller.

While the invention has been described in detail and with reference to specific embodiments thereof, it will be apparent to one skilled in the art that various changes and modifications can be made therein without departing from the spirit and scope of the invention. This application is based on Japanese Patent Application No. 2016-166923 filed on Aug. 29, 2016 and Japanese Patent Application No. 2017-159935 filed on Aug. 23, 2017, the contents of which are incorporated herein by way of reference.

INDUSTRIAL APPLICABILITY

A V-ribbed belt according to the present invention can be used as a V-ribbed belt for various belt transmission systems. Particularly, the V-ribbed belt according to the present invention is effective as a V-ribbed belt in a system including a small-diameter pulley such as an alternator serving as a power generator, or in an automobile engine auxiliary machine driving system.

DESCRIPTION OF REFERENCE NUMERALS AND SIGNS

1 . . . tension member
2 . . . compression rubber layer
3 . . . rib
4 . . . adhesive layer
5 . . . extension layer

The invention claimed is:

1. A V-ribbed belt having a plurality of V-rib portions extending along a longitudinal direction of the belt and in parallel with one another, and comprising a compression rubber layer including a frictional power transmission face at least a part of which is configured to come in contact with a V-rib groove portion of pulleys,
    wherein the frictional power transmission face of the compression rubber layer is formed from a vulcanizate of a rubber composition containing a rubber component and a noise suppression improver, wherein the noise suppression improver is at least one kind selected from the group consisting of a surfactant, a plasticizer having a larger solubility parameter than the rubber component, inorganic particles, and polyethylene resin particles, wherein a V-rib angle of the V-rib portions is larger than a V-rib groove angle of the pulleys by 5° to 9° thereby forming a gap between an end portion of each of the V-rib portions and a corresponding one of a plurality of V-rib groove portions of the pulleys, and wherein a torque loss of the V-ribbed belt is 0.20 N·m to 0.24 N·m when operated with the pulleys, and wherein the torque loss is measured based on applying an initial tension to the V-ribbed belt within a range of 100 to 600 N, and rotating a driving pulley at 2,000 rpm with no load on the driving pulley.

2. The V-ribbed belt according to claim 1, wherein the V-rib angle of the V-rib portions is 41° to 45°.

3. The V-ribbed belt according to claim 1, wherein the pulleys include a pulley having an outer diameter of 65 mm or less.

4. The V-ribbed belt according to claim 1,
wherein the noise suppression improver includes a polyethylene glycol nonionic surfactant and
a ratio of the polyethylene glycol nonionic surfactant is 2 to 20 parts by mass relative to 100 parts by mass of the rubber component.

5. The V-ribbed belt according to claim 1,
wherein the noise suppression improver includes an ether ester plasticizer and
a ratio of the ether ester plasticizer is 5 to 15 parts by mass relative to 100 parts by mass of the rubber component.

6. The V-ribbed belt according to claim 1, wherein the rubber component contains an ethylene-α-olefin elastomer.

7. A belt transmission apparatus comprising the V-ribbed belt according to claim 1 and the pulleys including a V-rib groove portion that can be fitted to the V-rib portions of the V-ribbed belt.

8. The belt transmission apparatus according to claim 7, wherein the pulleys include a pulley having an outer diameter of 65 mm or less.

9. A method for reducing torque loss of a belt transmission apparatus, the method comprising winding the V-ribbed belt according to claim 1 on pulleys including a pulley having an outer diameter of 65 mm or less.

* * * * *